United States Patent [19]

Pedone

[11] 4,006,521
[45] Feb. 8, 1977

[54] PIPE REMOVER

[76] Inventor: John A. Pedone, 19 Commonwealth Ave., Shrewsbury, Mass. 01545

[22] Filed: June 2, 1975

[21] Appl. No.: 583,049

[52] U.S. Cl. ................................. 29/282; 61/63; 175/53; 254/29 R; 294/86 R; 294/90

[51] Int. Cl.² .................. B21D 39/00; B23P 19/04

[58] Field of Search ............... 294/86 R, 86.12, 89, 294/90–97; 29/234, 237, 255, 256, 282; 61/72.1, 72.3, 72.4, 72.7, 63; 254/29 R, 30, 131, 133 R, 134; 175/53

[56] References Cited

UNITED STATES PATENTS

| 123,092 | 1/1872 | Divelbiss et al. | 61/72.7 |
| 176,201 | 4/1876 | Scott | 61/72.7 |
| 867,270 | 10/1907 | Himble | 61/72.7 |
| 1,897,561 | 2/1933 | Manucci et al. | 294/94 |
| 1,904,666 | 4/1933 | Sack | 61/72.7 |
| 2,377,304 | 6/1945 | Appel | 29/255 |
| 2,613,983 | 10/1952 | Knudsen | 294/97 |
| 2,687,324 | 8/1954 | Grunsky et al. | 294/96 |
| 3,201,944 | 8/1965 | Christensen | 61/72.7 X |
| 3,516,143 | 6/1970 | Lewallen | 29/234 |
| 3,744,836 | 7/1973 | Goettl | 294/95 X |

Primary Examiner—Johnny D. Cherry
Attorney, Agent, or Firm—Norman S. Blodgett; Gerry A. Blodgett

[57] ABSTRACT

A pipe remover for extracting a buried pipe from the ground by pulling an exposed end. The remover includes a grasping dog which engages the exposed end and a pushing dog which engages the buried trailing end. The two dogs are connected by a drawing element. By pulling outwardly on the drawing element, the pulling force is divided between pulling action on one end and pushing action on the other end. The pipe is usually extracted without breaking but, even if it breaks, is pushed through. The pipe may be simultaneously replaced by attaching a new pipe to the trailing end of the pushing dog.

6 Claims, 2 Drawing Figures

PIPE REMOVER

BACKGROUND OF THE INVENTION

A major problem in municipal maintenance is the replacement of deteriorated, underground, utility pipes which supply water and gas and remove sewage from individual households. The normal replacement technique is to dig a deep, wide trench, thereby exposing the pipe to be replaced. This trench follows the pipe from the center of the street, across the sidewalk, across any lawn and shrubs that are on the house lot, to the cellar of the house. The trench digging is not only costly and inconvenient, but also can be a source of danger to curious children and to workmen in the trench. There are instances, also, where obstructions are present where an excavation simply cannot be made, either mechanically or manually. Furthermore, there are situations where trenching can be accomplished only manually and in such situations the cost of pipe replacement is prohibitive in terms of time and cost.

An alternative to the standard approach is called "pipe pulling". This technique involves (1) freeing the inside end of the pipe in the cellar of the house, and (2) freeing the outside end at the center of the street by digging a small trench confined to the street and disconnecting the outside end of the pipe. A chain is then connected between the exposed outside end of the pipe and a drafting device, such as a tractor, and the pipe is pulled from the ground. By attaching a new pipe on the trailing end of the old pipe, a simultaneous replacement is effected. In the situations where this pulling technique can be effective, it still has two major problems. First, of course, there is the fact that, since the pipe is being removed because it has deteriorated, it often happens that the old pipe breaks half way through the operation leaving the residual section in the ground without either end exposed. Even if the residual section can be extracted by pulling it into the cellar on the attached new pipe, it is then usually impossible to implant a new pipe without using the trench method. A related problem, is the attachment of the replacement pipe to the trailing end of the old pipe. First, it is clear that this concept will place additional drag on the trailing end of the pipe and increase the likelihood of the old pipe breaking. This situation is aggravated by additional drag imposed by any connection between the pipes which is sufficiently strong to hold them together. Often, connections which were designed with low drag are not sufficiently strong to maintain the connection between the old and new pipe. The result is that the old pipe is extracted and the new pipe is not in place. Normally, the new pipe cannot be pushed through the remainder of the distance and the trench method must be used.

These and other difficulties experienced with the prior art devices have been obviated in a novel manner by the present invention.

It is, therefore, an outstanding object of the invention to provide a pipe remover which is capable of extracting a buried pipe with a minimum of excavation.

Another object of this invention is the provision of a pipe remover which minimizes the possibility of breaking the pipe to be removed.

A further object of the present invention is the provision of a pipe remover which permits the removal of the pipe even if it breaks during the operation.

It is another object of the instant invention to provide a pipe remover which provides a simple, effective, a low-drag-producing connection between the trailing end of the old pipe and a new replacement pipe.

A still further object of the invention is the provision of a pipe remover which is both simple and inexpensive to produce and flexible in the range of situations in which it is effective.

It is a further object of the invention to provide a pipe remover which performs its function at a minimum cost and with a minimum of destruction to surface structures.

With these and other objects in view, as will be apparent to those skilled in the art, the invention resides in the combination of parts set forth in the specification and covered by the claims appended hereto.

SUMMARY OF THE INVENTION

This invention involves a pipe remover for extracting and replacing buried utility supply pipes without expensive excavation. The pipe remover includes a grasping dog which is secured to a first exposed end of the pipe, a pushing dog which contacts a second exposed end of the pipe, and a pulling element which connects the two dogs together. By drawing on the pulling element, the pipe is both pulled and pushed from its buried condition with a minimum of stress concentrations along the length of the pipe. By connecting a new length of pipe to the pushing dog before the operation, extraction and replacement can take place simultaneously.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
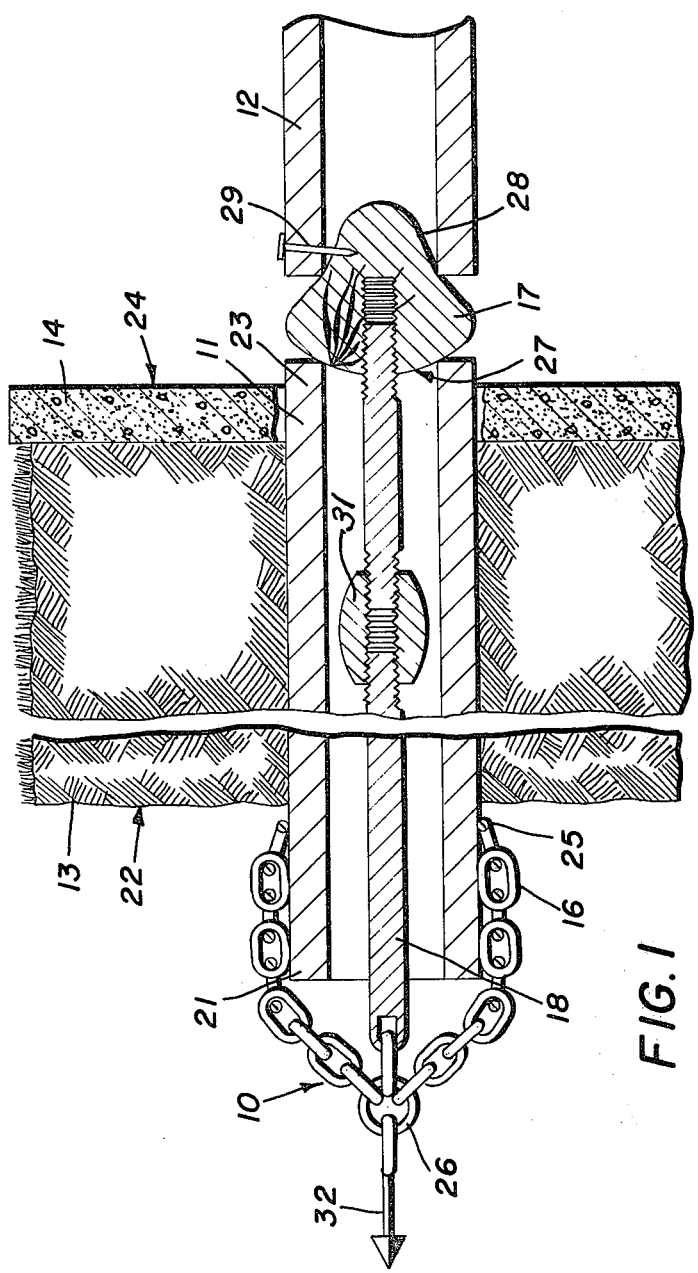
FIG. 1 is a sectional view of a pipe puller embodying the principles of the present invention.

Referring first to FIG. 1, in which the general features of the present invention are presented, the pipe remover, referred to generally by the numeral 10, is shown to include a grasping dog 16, a pushing dog 17, and a drawing element 18. Also shown in FIG. 1 are an old pipe 11 (which is buried in soil 13 and extends through the house foundation 14) and a new pipe 12. The old pipe 11 is shown as having a first, outside end 21 extending through an excavation wall 22 in the soil 13. The old pipe 11 also has a second, inside end 23 extending through the cellar wall 24 of a dwelling and into the cellar.

The grasping dog 16 is shown as involving a chain which securely engages the outside cylindrical surface of the old pipe 11 adjacent its outside end 21. The peripheral chain 25 is connected to the drawing center 26.

The pushing dog 17 is shown as having a bulbous body with a first side 27 and a second side 28. The first side has the shape of a hemisphere of large radius, while the second has the shape of an elongated cone. The first side extends radially beyond the inside circumference of the old pipe 11 and contacts the outside radial surface of the inside end 23 of the old pipe 11. The new pipe 12 is attached to the second side 28 of the pushing dog 17 by a fastening means 29, in this case a nail, through the wall of the new replacement pipe 12, and into the pushing dog 17.

Threaded through the first side 27 is one end of the drawing element 18. The other end of the drawing element 18 is connected to the drawing center 26. The drawing element consists of a plurality of threaded rods connected to one another by a coupling 31, which acts both as an adjuster to change the length of the rods, and a detachment which allows the drawing element to be demounted into its separate sections.

Also attached to the drawing center 26 is a drafting device 32 represented by an arrow. This drafting device might be any mechanism capable of providing outwardly directed axial force to the drawing center 26. The device might include a standard tractor with backhoe attachment or a specially designed jack. A winch or other mechanical or manual means can be used to provide the axial force.

The operation of the present invention will now be readily understood in view of the above description. Initially, the pipe 11 to be replaced is connected to the piping system of a house, passes through the cellar wall 24, and foundation 14, underground through soil 13 to the center of the street where it is connected to a main supply line. The operator excavates around the connection between the main supply line and the pipe 11 and severs the connection to leave a free outside end 21. Inside end 23 is then freed by disconnecting it from the piping system of the house.

The operator feeds the drawing element 18 through the old pipe 11 from either end. The pushing dog 17 is threaded onto the inside end of the drawing element 18. The replacement pipe 12 is fastened onto the second side of the pushing dog 17. The operator then wraps the chain 25 around the periphery of the pipe end 21 and locks it in place. The chain 25 and the outside end of the drawing element are then attached to the drawing center 26 so that outward pulling on the drawing center will result in an even distribution of force between the chain 25 and the pushing dog 17. The drafting device 32 is then attached to the drawing center 26 and outwardly directed axial force is applied to the drawing center 26.

The result of the drawing operation is that the old pipe 11 is pulled from the soil 13 and the new pipe 12 is inserted in its place. The ends of the new pipe 12 are freed and then reconnected to both the main supply line and the house piping system.

Figure 2:
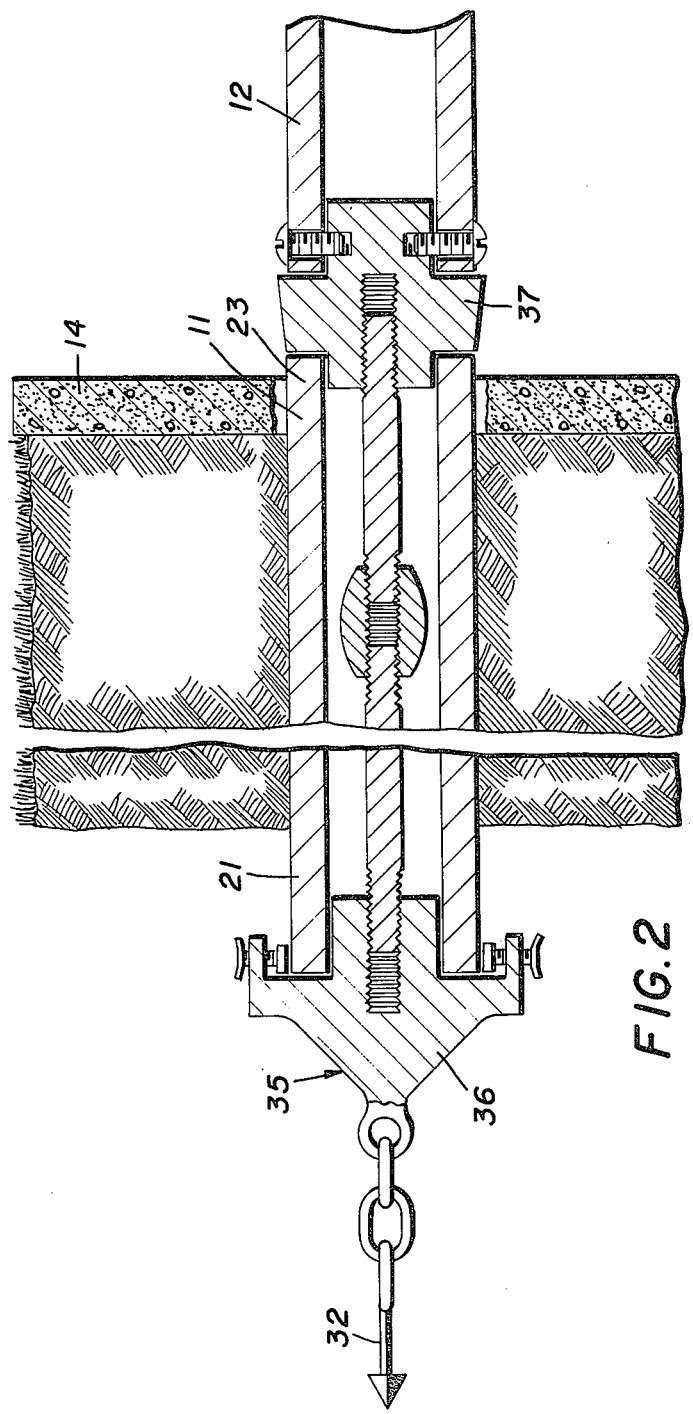
FIG. 2 is a sectional view of a modification of the pipe puller.

FIG. 2 shows modification of the present invention operating under conditions identical to the situation in FIG. 1. In this case the pipe remover 35 includes a grasping dog 36 which acts both to grasp the outside end 21 of the old pipe 11 and to function as the drawing center. The grasping action is accomplished using threaded clamps around the periphery of the outside end of the pipe.

The pushing dog is shaped to present a shape-conforming surface to the inside end 23 of the pipe 11 and to provide another way of attaching the new pipe 12 to the pushing dog 37.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A pipe remover for extracting an old buried pipe having a first end and a second end, comprising
   a. a pushing dog adapted for contact engagement with the second end of the pipe, the pushing dog having a first side which contacts the second end of the pipe and a second side which has a fastening means to secure a replacement pipe to the second side,
   b. a drawing element connected to the pushing dog and passing through the pipe to the first end to allow drawing of the element outwardly of the first end, and
   c. a grasping dog which is adapted to securely engage the first end of the pipe for axial pulling of the pipe outwardly of the first end, so that the pipe is pulled at its first end and pushed at its second end.

2. A pipe remover as recited in claim 1, wherein a pulling center is provided to which are connected the grasping dog, the drawing element, and a drafting device.

3. A pipe remover as recited in claim 2, wherein the drawing element is provided with an adjuster adapted to change the length of the drawing element between the pulling center and the pushing dog.

4. A pipe remover as recited in claim 1, wherein the drawing element is provided with an adjuster to change the length of the drawing element.

5. A pipe remover as recited in claim 1, wherein the drawing element includes a detachment by which the drawing element can be demounted into a plurality of separate sections.

6. A pipe remover as recited in claim 1, wherein the apparatus is used to insert a smaller diameter liner or piping into an existing large diameter service pipe.

* * * * *